INVENTOR.
HENRY PATRICK BEARER JR.

Aug. 9, 1960  H. P. BEARER, JR  2,948,013
PROGRAM CONTROL FOR SOOT BLOWERS
Filed Sept. 7, 1955  5 Sheets-Sheet 4

INVENTOR.
HENRY PATRICK BEARER JR.
BY
Charles L. Lovenshock
attorney

Aug. 9, 1960  H. P. BEARER, JR  2,948,013
PROGRAM CONTROL FOR SOOT BLOWERS
Filed Sept. 7, 1955  5 Sheets-Sheet 5
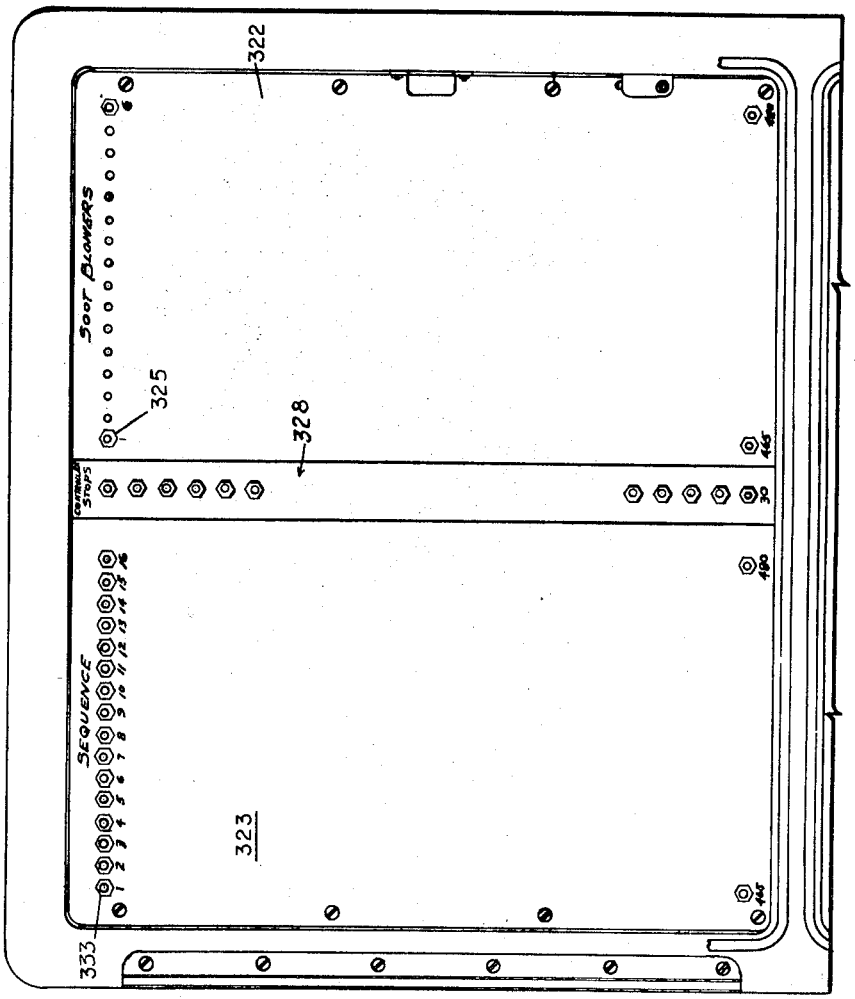
INVENTOR.
HENRY PATRICK BEARER JR.
BY

United States Patent Office 2,948,013
Patented Aug. 9, 1960

2,948,013

PROGRAM CONTROL FOR SOOT BLOWERS

Henry Patrick Bearer, Jr., Erie, Pa., assignor, by mesne assignments, to Blaw-Knox Company, Pittsburgh, Pa., a corporation of Delaware Filed Sept. 7, 1955, Ser. No. 532,904

12 Claims. (Cl. 15—316)

This invention relates to sequence controls and more particularly to controls for controlling the time at which soot blowers are operated in a particular sequence for cleaning boiler tubes in steam power plants and the like.

This application is a continuation in part of application Serial No. 433,668, filed June 1, 1954, which issued as Patent No. 2,902,707 on September 8, 1959, and constitutes an improvement and an extension thereof.

It is common practice to use soot blowers to periodically remove deposits of ash and other foreign matter from the heat transfer surfaces of steam boilers and the like. These soot blowers and the like have usually been actuated by manually actuated devices, making it necessary for an operator to turn on each soot blower or turn on several of the blowers at one time. It is difficult for the operator to time the operation of each of the soot blowers for maximum efficiency. Further, certain parts of a boiler are more susceptible to accumulate coatings of foreign substances than others and some should, therefore, be cleaned more often than others. It is extremely difficult to time the separately actuated blowers for maximum efficiency. The said prior application discloses a control for automatically actuating a plurality of soot blowers in sequence. A control is disclosed herein which will operate soot blowers in a "scrambled sequence." That is, certain blowers can be operated several times while others are operating only once or a fewer number of times during a single sequence program. The control also insures that no more than one blower will be operating at one time, therefore insuring that the power supply will not be overloaded. This makes it possible to keep the heat transfer surfaces of the boiler in optimum condition at all times.

The control disclosed herein is complete with indicating lights, valve function interlocks, annunciators, and means for controlling the time of blowing or cleaning programs. The controller disclosed herein is adapted to be made in a self-contained unit with all of its parts mounted and wired within a single cabinet. The particular blower and circuit controller disclosed herein using the particular components disclosed will control a maximum of one hundred twenty blowers; however, by employing the same principles disclosed herein, a greater number of soot blowers could be controlled by selecting and utilizing proper components.

The principal elements of the control disclosed herein are stepping switches, stepping relays, and a jack board, along with various other relays, contactors, and interlocks, all connected in a manner to operate a battery of blowers in a predetermined sequence. Patch cords are provided to connect between any of the sequence jacks and any one of the soot blower jacks selectively so that one of the soot blowers may be operated any time or any number of times during the sequence. A soot blower jack is then connected to the sequence jack by means of the patch cord and the sequence jack connection is completed through stepping switches to the power supply. Any one of the four soot blower jacks may be connected to any one of the sequence jacks which are connected to the stepping switches so that any soot blower may be operated as many as four times during the time that the sequence jacks are connected to the power supply. Each blower is preferably provided with a toggle switch or any other type of single pole, double throw three position switch. The toggle switches provide means for selectively connecting the individual blower unit to the power supply. The toggle switches have a manual position wherein each individual blower can be connected to the power line independently. Each toggle switch has a second position to cut the particular blowing unit out of the program or sequence so that it remains off until turned on. The toggle switch has a third position to connect the particular blowing unit into the sequence.

The sequence control can be actuated in three ways:

A. started manually;
B. operated continuously on a recycling basis; or
C. operated intermittently by a clock controlled timed sequence any number of predetermined times during a twenty-four hour period; for example, one hundred forty-four times during a twenty-four hour period.

The clock program may be set to trip its switch and start the controller after the desired number of units have operated and the controller has stopped. Therefore, the clock timer provides the means for setting up a six, eight, twelve, or twenty-four hour soot blowing program by setting the clock to start the controller after varying timed non-blowing intervals.

Specifically, it is an object of this invention to provide a controller for soot blowers to be controlled in sequence wherein the controller is simple in construction, economical to manufacture, and simple and efficient to use.

Another object of the invention is to provide a controlling device for controlling soot blowers in sequence according to a predetermined variable sequence wherein any machine in the sequence may be connected into the sequence repeatedly at will.

Another object of the invention is to provide a controlling device for machines wherein the machines may be controlled individually or they may be selectively controlled in sequence and the sequence may be varied at will.

Another object of the invention is to provide a controller for machines wherein the various components may be operated in a predetermined sequence and indicating lights are provided to indicate when each unit is working in the said sequence.

A further object of the invention is to provide a sequence control for machines wherein the control will continue to operate the machines through predetermined cycles repeatedly and automatically without being reset.

Another object of this invention is to provide a control mechanism wherein a plurality of machines may be controlled according to a predetermined sequence which contains means for operating the sequence at predetermined intervals of time.

Another object of the invention is to provide a sequence control for soot blowers wherein a plurality of indicating devices indicate the relative positions of the elements being controlled.

A still further object of the invention is to provide a means for indicating which particular machine is being controlled by a sequence control device at a particular time and indicated at its relative position on a diagram of the machine.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

Fig. 5 is a view of the jack boards for use with the wiring shown.

The parent disclosure of which this is a continuation in part discloses in detail a soot blower and a stepping relay such as may be used in the structure disclosed herein.

Figure 1:
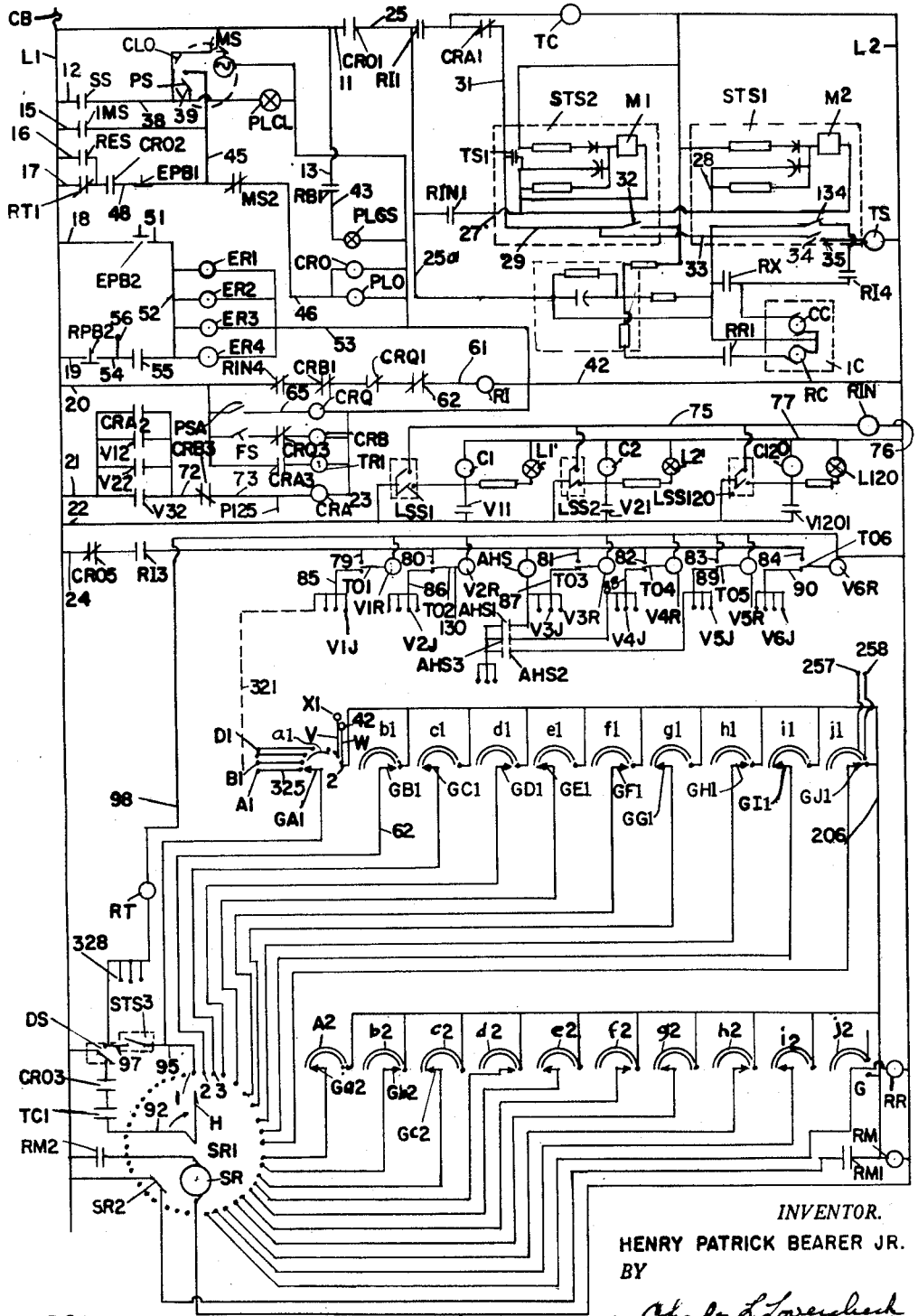
Figs. 1 and 2 are partial wiring diagrams of a sequence control according to the invention.

A plurality of units such as shown in the said parent disclosure will have their motors connected to a source of electrical energy by means of contactors actuated by solenoids V1R, V2R, etc. on the diagram shown in Fig. 1 wherein the solenoids are energized from the circuit shown. Stepping switches are shown in the said parent disclosure and the switches shown in Fig. 1 as STS1 and STS2 are similar to those shown in the said parent disclosure. A stepping relay having a single stage thereon is shown at SR.

Figure 4:
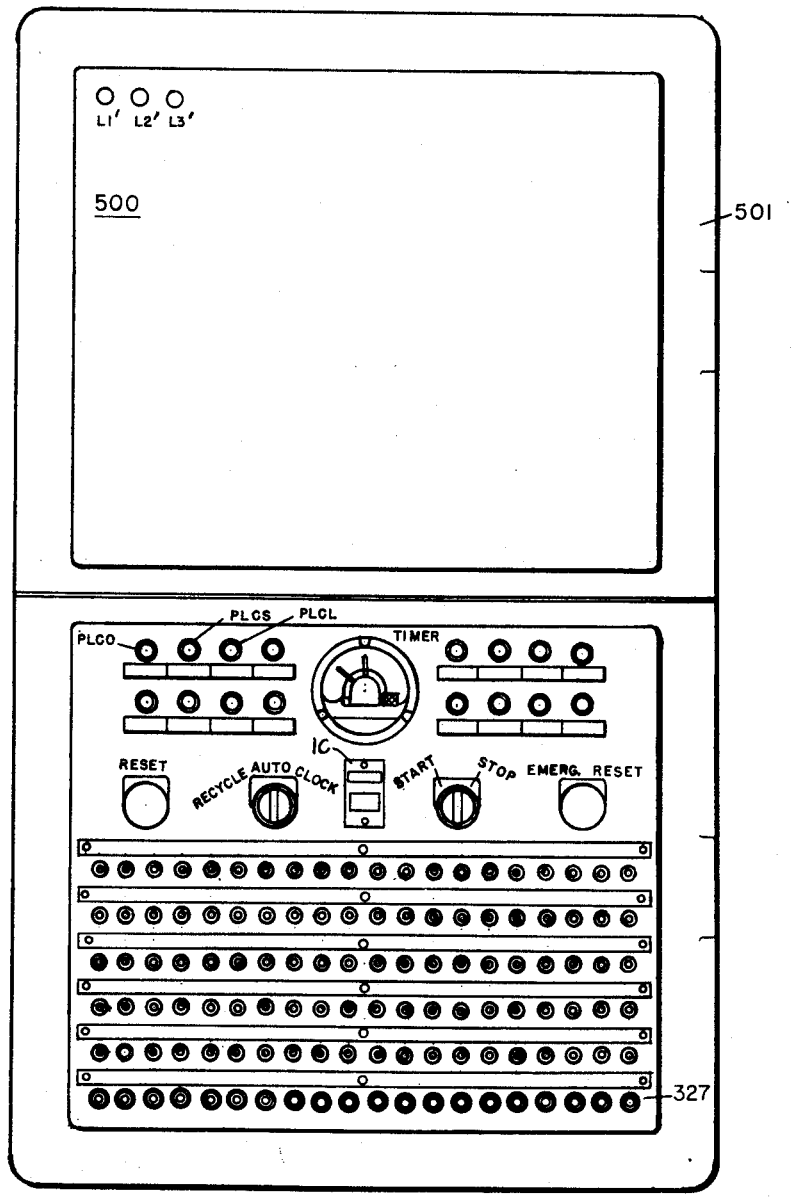
Fig. 4 is a front view of the cabinet.

To indicate which soot blower is operating at a particular time, a boiler diagram 500 which is shown in Fig. 4 is used. The diagram 500 shows a cross sectional view of the boiler and has miniature indicating lights L1', L2', L3', etc. adapted to be excited by electrical signals from switches on the individual blowers. The diagram 500 is mounted on the upper door on the face of the controller case. The lights do not lock on and are energized only while their respective unit is operating and they are operated directly from the unit stop limit switch. Thus, it is possible for the operator to determine at a glance which blower is operating if a blower unit is away from its at rest position at an improper time.

To give a further indication of the location in the sequence of the particular unit blowing at a particular time, an impulse counter 1C is used. The counter 1C is mounted on the lower door on the face of the controller case as shown in Fig. 4 and indicates the number of blowers which have operated. Program charts are supplied with the controller and are filled in accordance with the sequence program which is set up by patch cords on the jack board. In determining the location of the unit operating with respect to the program sequence, the number on the counter 1C is compared with the chart. A new chart will be required for each different program which is set up.

CATALOGUE OF SYMBOLS USED

STS1 and STS2—stepping switches
SR—stepping relay
CLO—clock having PS—program switch—and MS—motor switch—thereon and preferably having a maximum of one hundred forty-four open and one hundred forty-four closed operations for a twenty-four hour period for the particular control disclosed herein
SS—selector switch having three positions; i.e., clock, automatic, and recycle
MS—master switch having three positions; i.e., first position, momentary contact (start); second position, neutral; and third position, stop
RPB—reset push button
EPB—emergency retract push button
TS—time delay relay having normally open contact, slow make quick break
IC—impulse counter, preferably four digit with electrical reset
LSS1, LSS2, etc.—stop limit switches located on soot blowers or machines being operated which are actuated when the machine has been moved to the operating position
C1, C2, C3, etc.—motor contactors for connecting the motors of soot blowers or other machines, if other machines are being operated, onto a power line, which are actuated by the control circuit
ER1, ER2, ER3—emergency retract relays for reversing the operation of traversing motors on soot blowers or for connecting desensitizing devices of other machines being operated to a power line upon an emergency condition
TO1, TO2, TO3, etc.—toggle switches or other three positioned switches for connecting the control disclosed herein in three positions; i.e., first position, in sequence; second position, off; and third position, connecting the individual devices selectively and directly
V1R, V2R, V3R, etc.—solenoids of unit relays having contacts thereon actuated by the solenoids to connect the motors of soot blowers or other machines to be operated to a power line

Control relays

CRO—controller relay
ERR—emergency retract relay
RI—interlock relay
CRA—timing relay
RIN—unit in operation relay
RT—controller stop relay
AHS—simultaneous air heater relay
CRB—unit blowing relay
CRQ—air heater blowing relay
DS—door switch or safety switch which opens and stops the controller when the door of the cabinet is open
L1', L2', L3', etc.—boiler diagram unit lights only energized while soot blower unit or machine being actuated is in operation

Indicator light relays

CRT—time exceeded
CRE—no blowing air
HP2—header pressure
HP1—low header pressure
REO—motor overload
RP—low receiver pressure
AC—control voltage available

Indicator lights

SB1S—soot blower in service
BL—some blower blowing
STA—static
TE—time exceeded
NBA—no blowing air
LRP—low receiver pressure
LPH—low header pressure
ACB—air cleaner blowing
ACO—air heaters operating
B1B—Boiler No. 1 operating
MO—motor overload
CBA—control voltage available In the exemplary sequence control disclosed herein, the jack board, the means by which the sequence may be varied, is of the type frequently found in telephone offices and is mounted inside the upper door 501 in the front of the case. The jack board for one hundred twenty units as shown in Fig. 5 is provided with four hundred eighty sequence jacks 333 and four hundred eighty soot blower jacks 325. There are four jacks for each blower to be operated, thus allowing each blower to be operated up to four times in one complete sequence. Therefore, the number of jacks on the unit side 322 of the jack board match the number of jacks on the sequence side 323. If there are less than the maximum of one hundred twenty blowers, then the extra jack positions on the unit side are divided among those blowers which will be used more frequently.

The sequence side of the jack board is connected to the soot blower side by means of patch cords 321 which have plugs on each end adapted to be received in the jacks of the jack boards 322 and 323. Thus, any unit may be operated at any point in the sequence by merely plugging one end of the patch cord 321 into the unit jack and the other end into the sequence jack which has been selected.

One toggle switch TO1, TO2, etc. per each blower is provided and they are mounted on the lower door on the face of the case at 327. These switches are connected in series to the unit jacks for the respective units on the jack board. The toggle switch provides the means for cutting the unit jacks in or out of the program and also provides the means for manually starting the units.

In the middle of the jack board are thirty jacks 328 marked controller stops. These jacks 328, when connected by a patch cord 321 to a sequence jack, stop the operation of the controller at the position in the sequence to which they are connected. To start the controller from a stop position, the operator has the option of starting it manually with the master switch or automatically after a predetermined interval by the clock control.

The clock timer mounted on the face of the lower door of the case has provisions for one hundred forty-four off and one hundred forty-four on positions per a twenty-four hours period. In using the clock, the master selector switch is set at clock control and the clock must then be synchronized with the starting of the blowing program. Next, two pins are placed on the clock's program disk to give a five minute impulse at the time desired to start the controller again after it has been stopped by a controller stop jack. Thus, the clock timer can be set to start the controller from any one or all of its stop positions. The start positions on the clock must also be synchronized with the blowing time required for the various types of soot blowers. That is to say, the clock program disk must be set to trip its switch and start the controller after the desired units have operated and the controller has stopped. Therefore, the clock timer provides the means for setting up a six, eight, twelve, or twenty-four hour soot blowing program by starting the controller after varying timed non-blowing intervals.

Note: Normally open contacts will be referred to as "NO" and normally closed contacts will be referred to as "NC."

The controller relay has a solenoid CRO and three NO contacts CRO1, CRO2, and CRO3 and one NC contact CRO4. The interlock relay has a solenoid RI and it has three NO contacts RI1, RI2, and RI3. Air heater relay CRQ has a solenoid so indicated and has NC contacts CRQ1 and CRQ3 and an NO contact CRQ2. The unit blowing relay has a solenoid indicated CRB which has NC contacts CRB', CRB1, and CRB3 and NO contact CRB2. Time delay relay TRI has a solenoid so indicated which has an NO contact TRI1. The timing relay has solenoid CRA and has an NC contact CRA1 and two NO contacts CRA2 and CRA3. Relay RIN has a solenoid so indicated in Fig. 1 and has four NO contacts RIN1, RIN2, RIN3, and RIN5 and an NC contact RIN4. Each blowing unit has a relay number corresponding to the number of the unit, for example, V1R, V2R, V3R, etc., and the solenoids are indicated in Fig. 1 by corresponding number. Each blower relay has two normally open contacts. V1R has contacts V11 and V12; V2R has contacts V21 and V22, etc. Simultaneous air heater relay AHS has NC contacts AHS1, AHS2, and AHS3 for connecting air heater cleaners. Stepping switch STS1 has stages $a1$, $b1$, $c1$, $d1$, $e1$, $f1$, $g1$, $h1$, $i1$, and $j1$. Stepping switch STS2 has stages $a2$, $b2$, $c2$, $d2$, $e2$, $f2$, $g2$, $h2$, $i2$, and $j2$. The common terminals $Ga1$, $Gb1$, $Gc1$, etc. of the stepping switches STS1 and STS2 are connected to the terminals 1, 2, 3, etc. on the stepping relay SR to the wires as shown. The stepping relay SR has a common terminal H connected through wires 92 to L1.

*Connections*

The wires L1 and L2 indicate the two sides of an alternating current power line; for example, 110 volt, 60 cycles A.C. The line L1 is connected through the circuit breaker CB to the wires 11, 12, 13, 15, 16, 17, 18, 19, 20, 21, 22, and 24, respectively. NO contact CRO1 connects wire 11 through wire 25 to RIN1 and to RI1. NO contact RIN1 connects wire 25 to terminal 27 on stepping switch STS2 and to terminal 28 on stepping switch STS1. These terminals are connected through proper rectifiers and filters to the motor magnets M1 and M2, respectively. Wire 25 connects to wire 25$a$ to one side of the counter motor CC. The other side of the counter motor CC is connected through RI4 through the contact 134 on stepping switch STS1 through a resistance and the rectifier 30 to the line L2. Wire 25 is connected through NO contact RI1, NC contact CRA1, through wires 31 and 29 to NC motor operated contact 32 on stepping switch STS2 and through wire 33 to NC contact 34 on stepping switch STS1 to wire 35 to the solenoid TS and then to the line L2. Wire 12 is connected through NO contact SS to wire 38, then to the terminal 39 on the clock, through NO contact PS thereon to the wire 45 which connects through NC MS2 through wire 46 to CRO and PLO solenoids to the wire 42 and the line L2. Wire 38 also connects through NO contact MS to the clock motor. Wire 13 connects through NO contact RB1 to the wire 43 and through the pilot light PLGS to the wire 42. Wire 15 connects through NO contact 1MS through wire 45 through NC contact MS2 to wire 46 through the solenoids CRO and PLO to wire 42. Wires 16 and 17 are connected through NO contact RES and NC contact RT1, respectively, through NO contact CRO2 to wire 48 and through NC contact EPB1 to wire 45.

The wire 18 connects through NO contact EPB2 of the reset button to the wire 51, to wire 52, to the emergency relays ER1, ER2, etc., and through the wires 53 and 42 to line L2. Emergency relays ER1, ER2, etc. have contacts thereon connected to circuits for withdrawing the blower tubes of the soot blower from the boiler in case of emergency. Wire 51 is also connected through solenoid RX to L2. Wire 19 is connected through NC reset button RPB2 through wire 54 through NO contact 55, which may be any interlock required to energize emergency retract relays. Wire 54 is connected through wire 56 to NO contacts RIN2, CRB4, CRT1, TRI1, CRE2, HP2, and REO1 to the various components shown in Fig. 2.

Wire 20 is connected through the series connected contacts which are NC RIN4, CRB1, CRQ1, and contact 62, which may be any interlock needed to stop operation, through wire 61, through the solenoid RI to the wire 42 and to line L2.

Wire 20 is also connected through abnormal pressure contact PSA through wire 65, through solenoid CRQ, through wire 42, to line L2. Wire 20 is also connected through switch FS, contact CRQ3, through solenoid CRB to line 42. Wire 20 is also connected to normally open contact CRA3 to solenoid TRI to line 42.

Wire 21 is connected through the parallel connected NO contacts CRA2, V12, V22, and V32 to wire 72, through NC contact CRB3 to wire 73, through solenoid CRA to L2. Also, wire 73 is connected to point P125.

Wire 22 is connected through NO limit switches LSS1, LSS2, LSS120, etc., one of which is mounted on each machine to solenoid RIN. Each limit switch is closed when the machine on which it is mounted is in operation and has moved from its home position. Wire 22, at the same time, is connected through NO contacts V11, V21, etc. to the motor contactors C1 and C2 to line 77 and to line L2. Lights L1', L2', etc., being connected in parallel with solenoids C1, C2, C120, etc., will glow when the corresponding contacts V11, V21, etc. are closed, indicating the corresponding blowers are operating. NO contacts V11, V21, and V1201 will be closed when the corresponding solenoids V1R, V2R, etc. are energized and, therefore, the wire 22 will be connected through the solenoid C1 to line L2 when the corresponding motor contactor has been energized. Wire 24 is connected through NC CRO5 and NO RI3 to terminals 79, 80, 81, 82, 83, and 84, respectively, of toggle switches TO1, TO2, TO3, etc. The other single terminals 85, 86, 87, 88, 89, and 90 of toggle switches TO1, TO2, TO3, TO4, TO5, and TO6, respectively, are connected to the four jacks on each connection V1J, V2J, V3J, V4J, V5J, and V6J, respectively. These jack connections may be selectively connected through the patch cords 321 and any similar patch cords to any desired terminals A1, B1, etc. of terminals on the stepping switch. Any terminal of the stepping switches is connected to the solenoids V1R, V2R, V3R, etc. of the blower unit relays so that the blowers may be operated separately or in sequence.

The common terminal H of stepping relay SR is connected through wire 92, through NO contacts TC1 and CRO3 through NC door switch DS to wire L1. The first point on the stepping relay SR is connected through wire 95 through off normal spring stepping switch STS3 to wire 97 and through solenoid RT to wire 98. Wire 98 connects to one side of the solenoids V1R, V2R, V3R, V4R, V5R, and V6R, respectively, and to L2. Line 97 is also connected through door switch contact DS to line L1. The wire 100 connects line L2 to the solenoid SR and the other side of solenoid SR is connected through NO contact RM2 to L1. The penultimate positions on each stage a1, b1, c1, d1, etc. of the stepping switches STS1 and STS2 are each connected through wire 206 to one side of solenoid RM. The other side of RM is connected to L2. Each time the stepping switch STS2 reaches its penultimate position, the solenoid RM will be connected across L1 to L2. RM2 will be closed, energizing solenoid SR and causing stepping relay common terminal H to advance one step, connecting wire 92 to the next stage on the stepping relay. When stepping relay SR is energized, its contact H will move, breaking the circuit through the solenoid RM from the stepping switch, but contact RM1 will supply solenoid RM until contact SR2 opens, deenergizing RM and causing RM1 and RM2 to open. SR2 opens after common terminal H has moved from one terminal and reached the next, interrupting the circuit through RM1 to RM.

Figure 2:
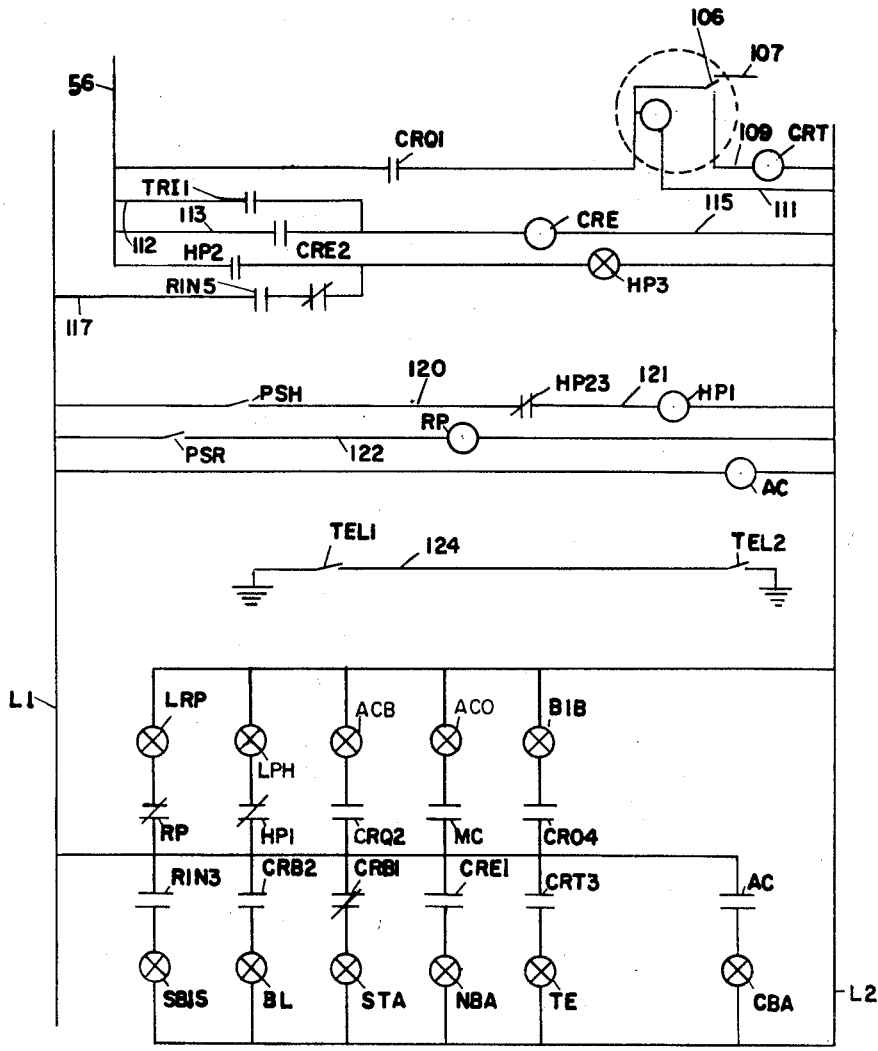
Figure 3:
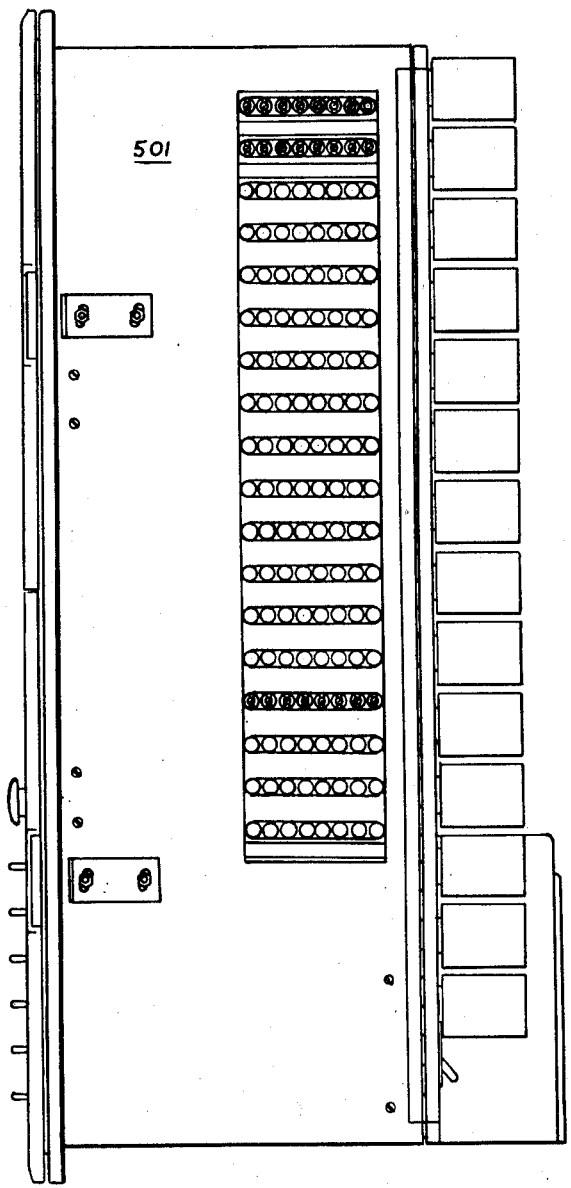
Fig. 3 is a side view of the cabinet housing the device according to the invention.

Referring to Fig. 2, L1 is also connected through NO contact PSH, which closes when the head of pressure is normal when steam or air is used as a blowing medium, to wire 120 and through NO contact HP23 through wire 121 to solenoid HP1 to line L2. Line L1 also connects through NO contact PSR to wire 122 and through solenoid RP to line L2. The line L1 also connects through solenoid AC to line L2. Sound or telephone jacks may be incorporated in the panel and the jack TEL1 connects through wire 124 to telephone jack TEL2. The indicator lights LRP, LPH, ACB, ACO, and B1B and lights SB1S, BL, STA, NBA, TE, MO, and CBA have one side thereof connected to L2 and the other side thereof connected to L1 through contacts RP, HP1, CRQ2, MC, CRO4, RIN3, CRB2, CRB, CRE1, CRT3, REO, and AC, respectively.

*General operation*

On the lower door on the face of the controller are mounted the main control switches MS and SS. Also located thereon is the master switch for starting or stopping the sequence program and, also, a selector switch which provides the following control selections:

(A) "AUTO"—this allows the controller to run through one complete sequence program. Manual starting is required from stop positions. The controller will shut off automatically at the completion of one program.

(B) "RECYCLE"—this differs from automatic control in that the controller does not shut off at the completion of one program but allows the controller to recycle automatically until stopped manually. Manual starting is required from stop positions.

(C) "CLOCK"—this control provides automatic starting after present time intervals from stop positions. It also allows for automatically starting the sequence at a preset time.

A reset push button RPB2 is provided to permit the resetting of the interlock circuit and the warning light after the malfunction has been corrected. Also provided is a panic push button EPB2 to allow a fast means for emergency retracting a long retractable soot blower in case of a malfunction not protected against by the interlock circuit.

Also mounted on the lower door are the controller indicating lights and interlock warning lights. The standard indicating lights supplied are "Clock in Operation," "Controller Stopped," and "Controller in Operation." An elapsed timer can be provided as can various other malfunction indicating lights and protective circuits. The interlock circuit is engineered specifically for each installation in accordance with the type of soot blowers controlled and the degree of protection desired.

The toggle switch as illustrated provides three control functions for its soot blower unit. It allows the unit to be inserted into the sequence program or taken out of the sequence (off) and also provides a means for manually starting the unit. The toggle switch cuts all of the unit jacks in or out of the circuit at one time.

Before starting the blowing cycle, the blowing program is set up on the jack board as illustrated by plugging one end of the patch cord 321 into the sequence jack and the other end into the unit jack. If some of the sequence positions are to be skipped, the patch cords 321 are left out of those positions. The controller will automatically step by these positions without stopping.

When the unit jacks are connected to the sequence jacks and the toggle switches are in the "In Sequence" position, the controller, when started, will pick up the impulses from the jacks and send them to the unit start relays. The relays, in turn, will energize the motor contactor for that particular soot blower unit, thus starting the blower. The controller allows only one blower to operate at a time and, at the completion of the blowing cycle, it then starts the next unit connected into the sequence. Any sequence jack not connected to a unit jack or any unit which has its toggle switch in the off position is automatically bypassed.

At the same time the unit start relay energizes the motor contactor for a particular unit, it also energizes the program light for the corresponding unit. This circuit is then maintained by the unit's stop limit switch. Therefore, the light illuminates the program number for the blower which is operating and only while it is operating.

*Specific operation*

Specifically, in operation, the circuit breaker CB will be closed to apply power to the line L1 and the other side of the power supply will be connected to L2. Relay AC will be energized and light CBA will glow, indicating the power is turned on. A blowing medium such as air or steam will be connected to the soot blowers. PSA is a pressure switch used for air heater cleaners to give an indication when a particular air heater cleaner is blowing. One light ACB will be provided for each air heater cleaner and one switch PSA will be disposed on each air heater. The blower operating will have its switch PSA closed and the corresponding light ACB will glow, giving an indication that the particular air heater cleaner is blowing. When air is used as a blowing medium, pressure switch PSR will close on high normal receiver pressure energizing relay RP. Also, pressure switch PSH closes on high normal header pressure when steam or air is the blowing medium energizing solenoid HP1 to close contact HP2 and cause HP3 to glow.

Mutual control

When it is desired to operate an individual blower without operating any of the other blowers, CB is closed. This will energize RI and close RI1. The toggle switch corresponding to the particular blower will be closed to the position connecting the particular unit to L1 through CRO5 and RI3. For example, if blower 2 is to be operated, toggle switch TO2 will be moved to the position to connect terminal 30 to the wire L2. This will connect the solenoid V2R directly across lines L1 and L2 and solenoid V2R will be actuated and will close its contactor, contacting the corresponding soot blower motor to its power supply. At the same time, contact V21 actuated by V2R will be closed and this will cause pilot light L2' to light, indicating that the blower connected to V2R is in operation. The blower will operate until the toggle switch is moved back to its off position (the position shown in Fig. 1). Then the blower will stop and the blower will be cut out of the sequence until the toggle switch is again closed. If a patch cord is connected from any jack 328 to one of the jacks on stages a1—j1 or A2—J2 when the particular movable contact on that stage reaches that contact in turn, solenoid RT will be energized, thereby stopping the operation of the sequence at this point.

Sequence operation

When it is desired to operate the control to operate the soot blowers connected thereto, the operator will close circuit breaker CB and thus turn power on to L1 and L2. This will apply power to solenoid RI through wires 61 and 42. Relay RI will be energized and contacts RI1, RI2, and RI3 will close. The wires 79, 80, 81, 82, 83, 84, etc. will be energized through RI3 so that if it is desired to operate the blower units manually, the units can be started individually by closing the toggle switches TO1, TO2, etc. corresponding to the unit to be operated to the position which will connect wires 79, 80, 81, etc. to units V1R, V2R, V3R, etc.

To operate the control in sequence, the toggle switches corresponding to each unit which is to be operated must be closed to the position which will connect the units to their corresponding jack boards and patch cords similar to patch cord 321 must connect the unit jacks to the sequence jacks. To start the sequence operation, the manual start button 1MS will be closed. This will energize solenoid CRO and close contacts CRO1, CRO2, CRO3, and CRO4 and open contact CRO5. CRO5 being then open, toggle switches to individual units will be ineffective to operate the units manually. CRO4 will cause the signal B1B to indicate that boiler number 1 is operating. Since TC is now energized through RI1, TC1 will be closed. CRO3 and TC1 being closed, a circuit will be established through wire 92 to solenoid RT and RT will close. This will open contact RT1 and, therefore, break the circuit through wire 48 to CRO. It will therefore be necessary for the operator to continue to hold the contact 1MS closed until after the stepping switches STS1 and STS2 have moved and opened contact STS3. During the time the contact 1MS is held closed since CRO1 is closed, current will flow through wire 25, contacts RI1 and CRA1, and wire 31 to the contacts 32 and 134 through the solenoid TS. This will energize TS and close contact TS1 and establish a circuit through M1 and M2, therefore causing M1 and M2 to cock their ratchets.

When M1 and M2 are energized, they will open the contacts 32 and 134 which will interrupt the circuit through TS and, therefore, will cause solenoid TS to be deenergized. This will open contact TS1 and deenergize M1 and M2, thereby allowing the spring to step the stepping switch common terminal to the first position, moving common terminal GA1 into contact with wire A1. The other common terminals of the stepping switches, being mechanically connected together and to GA1, will move to their first position but they will have no effect since no circuit is connected to them through stepping relay SR. Since a circuit is now complete to the first stepping switch terminal A1, current will flow from L1 through CRO3, TC1, wire 92, common terminal H, through the common terminal GA1 to the terminal A1, through the patch cord 321 connected thereto, through the jack board connected to the patch cord, for instance V1J, through the wire 85, through the toggle switch TO1, and then through the solenoid V1R which will close contacts V11 and V12 and excite solenoid C1 which will be provided with contacts to connect the soot blower to a power supply. This will cause the soot blower to start and will also cause the light L1' to light, indicating that C1 is operating. V12 will complete a circuit through CRA which will open CRA1 and close CRA2, locking CRA in and closing CRA3 and energizing TR1. TR1 has a time delay of twenty seconds and if the blowing medium has not started in twenty seconds, TR1 will close and close TR11, energizing solenoid CRE. CRE2 will lock CRE in and CRE1 will energize NBA to warn the operator that the blowing medium is inoperative. If, however, the blowing medium starts within twenty seconds, flow switch FS will be actuated by the flow and will close, energizing CRB. This will open CRB3 and thus deenergize CRA. CRA will open CRA3, deenergizing TR1. CRA1 will close and CRA2 will also open. CRB1 will deenergize RI.

As soon as the soot blower is moved by the motor driving it actuated as described above, the limit switch LSS1 will close. This will excite solenoid RIN and lock the solenoid C1 closed. RIN will close RIN1, energizing M1 and M2 which will cause them to actuate a ratchet therein. RIN3 will energize SB1S and RIN4 will open the circuit to RI. The soot blower will continue to blow through its cycle until the contact of the limit switch LSS1 opens. When the soot blower has completed its cycle, the limit switch LSS1 will open, causing RIN to be deenergized, and RIN1 will deenergize the solenoids M1 and M2 so that a spring therein can move the stepping switches to their next position. If any one blower requires more than the predetermined time to operate, indicating difficulty, the timer shown within a broken line circle in Fig. 2 will close contact 106 and this will actuate CRT which will close CRT3 and actuate signal TE, warning the operator of the difficulty. The timer may be a conventional timer having a contact 106 movable from a normally open position connecting line 56 with line 107 to a normally closed position where it will connect the line 56 with line 109 to actuate CRT. The line 107 is not used in the present circuit but is conventionally present on most timers. The timer used has the actuating solenoid shown.

When the stepping switches have stepped over each of the stepping switch contacts connecting on the stage thus connected to stepping relay SR, each of the soot blowers connected to the stepping switch jack board through patch cords on the respective jack boards V1J, V2J, V3J, etc., power will flow through wire 206 and RM will be energized and locked in by RM1. RM2 will close, completing a circuit through solenoid SR to cause it to step its common terminal H to its next position, connecting L1 through wire 92 and wire 62 on stage b. The units attached through patch cords to stage b will be actuated similar to the operation of the units described above as stepping switch STS2 moves common terminal GA2 over the terminals on the stage. When common terminal GJ2 reaches its penultimate position, the solenoid RR will energize. This will close RR1 and reset the counter. On the next step of the stepping switch, the solenoid RM will be energized and RM1 will close, locking in RM and closing RM2 which will actuate SR which will actuate RT through STS3, opening RT1, dropping out CRO, and stopping the controller.

If it is desired to operate the sequence control through sequences at predetermined intervals, the operator will close the switch SS. This will provide a circuit from L1 through PS, when closed, to CRO. Therefore, when the clock CLO is operated, it will periodically at predetermined times close PS and operate CRO and the other circuit elements in sequence in the same manner that the circuit operates as described above.

If it is desired to operate the circuit constantly, that is, as soon as all the blowers have operated in one sequence of blowing to restart the sequence, the recycle switch RES will be closed. This will keep the circuit between L1 and wire 45 closed, RT1 will be ineffective, and RES will cause the sequence control to repeatedly operate the soot blowers until the switch RES is opened.

The contacts PSH and PSR can be connected to actuating devices to be deactuated when the header pressure, receiver pressure, or any other functional part of the equipment is not functioning properly. The actuation of these switches will excite the corresponding signal to notify the operator of the difficulty.

*Automatic recycle operation*

If it is desired to recycle the complete sequence, the recycle switch RES will be closed and since the connection between wires 48 and L1 is always completed, the relay CRO will be energized at all times. Therefore, the sequence program will continue to recycle until the recycle switch RES is opened.

*Time sequence*

If it is desired to actuate the control through a complete sequence cycle at predetermined times, the clock CLO is set for this particular interval. The clock may be any type of timing control having a motor running at a constant rate and having an NO contact PS and an NC contact MS. To operate the circuit through the clock, the clock switch SS is closed, thereby applying power to the indicating light PLCL which indicates the clock is in operation. The contact MS being NC, the clock will then close contact PS at a preset time. This will, at a preset time, connect the wires 38 and 45 and will have the same effect as closing the manually operated switch contact IMS to start the cycle as described above. Therefore, each time the clock control is actuated by SS, the contact PS will close at a predetermined time and the cycle will be started. It will be noted that the same effect will be had by closing the contact IMS. For convenience, 1MS and 2MS should be mechanically interlocked to operate together as a single switch having a normally open and a normally closed contact.

To stop the cycle in case of emergencies, the master switch is turned to the stop position, opening its NC contact MS2, breaking the circuit through wire 46 to relay CRO which stops the stepping switches.

*Safety interlocks and signals*

PSH may be connected to a pressure sensing device connected to the blowing medium header. If the header pressure is low, PSH will open, deenergizing relay HP1 which will, in turn, deenergize relay HP2 and the NC contact on HP1 will energize the low header pressure light HP3. A pressure sensing device on the receiver may be connected to actuate PSR. This pressure switch will open when the pressure in the receiver falls below a set minimum which will deenergize relay RP whose NC contact will then energize the low receiver pressure light LPR. When it is desired to have an indication that an air heater cleaner is blowing pressure, sensing device PSA will be used which, when actuated, will energize relay CRQ whose normally open contact will close, energizing light ACB, indicating that the air heater cleaner is blowing.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, a control for a plurality of soot blowers and a plurality of soot blowers connected thereto comprising a stepping switch having a plurality of separate contacts and a stepping solenoid connected in said control, a common contact adapted to be moved successively into contact with each said separate contact by said stepping solenoid, said stepping solenoid having means to move said common contact to another said separate contact each time said solenoid is deenergized, means to connect said soot blowers to a source of power, said means comprising a plurality of jack connections on the electrical means connected to each said soot blower, jacks on each said separate contact, patch cords connecting the jacks associated with each soot blower with separate contact jacks, and means to maintain said movable contact in engagement with each said separate contact while the blower connected thereto is completing a blowing cycle, said stepping switch having a plurality of separate stages, said separate contacts and movable contact comprising corresponding separate and movable terminals in each stage, a separate contact jack being associated with each separate terminal, a stepping relay, said stepping relay having a movable terminal and a plurality of separate terminals, said separate terminals on said stepping relay each being connected to a different one of said stepping switch movable terminals, said stepping relay movable terminal being connected to a source of power, a stepping relay solenoid connected to move said stepping relay movable terminal, said stepping relay solenoid being connected to one said separate stepping switch terminal on each of said stages whereby said stepping relay solenoid is energized to advance said stepping relay movable terminal each time a said stepping switch movable terminal connected to said stepping relay movable terminal engages a said stepping switch fixed terminal attached to said stepping relay solenoid.

2. The combination recited in claim 1 wherein said control comprises a controller stop relay which has a solenoid having a plurality of jacks adapted to be connected by means of patch cords to predetermined separate terminals on said stepping switch, and a normally closed contact on said controller stop relay governing said source of power whereby said normally closed contact is opened by said controller stop solenoid when said stepping switch movable contact energizes a separate contact connected to said controller stop relay.

3. The combination recited in claim 2 wherein a unit in operation relay is connected in said circuit and actuated when one said soot blower is actuated and said unit in operation relay preventing any blower from starting operation until a given blower has returned to a neutral position.

4. The combination recited in claim 2 wherein said unit in operation relay is connected to said power source by a normally open limit switch on each said soot blower whereby said unit in operation relay is energized and said stepping switch solenoid actuated each time a soot blower moves off normal position.

5. In combination, a sequence control and a plurality of soot blowers for blowing deposits of foreign matter from the tubes of steam boilers comprising a plurality of soot blowers, a stepping relay, a stepping switch, said stepping relay having a plurality of spaced terminals and a common terminal, said common terminal being connected to a source of electrical power, motor means operably connected to said common terminal moving it over said spaced terminals to connect said power to said spaced terminals, said stepping switch having a plurality of movable terminals mechanically connected to move together, a plurality of sets of fixed terminals on said stepping switch, each said movable terminal having common means to move it over one set of said fixed terminals to electrically connect one said movable terminal in turn with each said fixed terminal on one said set of fixed terminals, each said spaced terminal on said stepping relay being connected to one of said movable terminals on said stepping switch, a jack board, a plurality of first jacks on said jack board, each of said fixed terminals on said stepping switch being connected to one of said first jacks, second jacks on said jack board, a plurality of said second jacks being connected to an actuating means for each said soot blower, patch cords, each said patch cord connecting one of said first jacks to one of said second jacks, and means on and associated with each said soot blower to actuate said means on said stepping switch to advance said movable terminals thereon to another fixed terminal thereon after the said soot blower then connected through said movable terminal has completed its blowing cycle.

6. The combination recited in claim 5 wherein the last fixed terminal on each set of fixed terminals on said first stepping switch is electrically connected to said motor means on said stepping relay whereby said motor means is driven to advance said common terminal to another spaced terminal connecting said power source to another said movable terminal each time one said movable terminal has moved over all of the said fixed terminals in the said set of terminals over which it moves.

7. The combination recited in claim 5 wherein said stepping switch has a plurality of movable contacts movable together and a plurality of sets of fixed contacts, each said movable contact being movable over one said set of fixed contacts, each said movable contact on said stepping switch being electrically connected to a spaced terminal on said stepping relay, said fixed contacts on said stepping switch being connected to additional first jacks on said jack board, some of said soot blowers being connected to said additional first jacks on said jack board.

8. The combination recited in claim 5 wherein said stepping switch has a motor and has a normally closed contact opened when said stepping switch motor is actuated, a time delay solenoid connected in series with said normally closed contact and having a normally open contact connected to said stepping switch motor adapted to complete a circuit to said stepping switch motor when said time delay is energized whereby said normally closed contact opens and de-energizes said time delay relay.

9. The combination recited in claim 8 wherein said circuit includes a unit in operation relay having a solenoid, means on each said soot blower to actuate said unit in operation relay, a normally open contact on said unit in operation relay connected in series with said stepping switch motor and adapted to connect a power supply to said stepping switch motor when each said soot blower is actuated during its cycle, said unit in operation relay being de-energized when said soot blower has completed its cycle whereby said motor is de-energized through the normally open contact on said unit in operation relay at least.

10. The combination recited in claim 5 wherein said control comprises a controller stop relay which has a solenoid having a plurality of jacks adapted to be connected by means of patch cords to predetermined fixed terminals on said stepping switch, and a normally closed contact on said controller stop relay governing the power supply whereby said normally closed contact is opened by said controller stop solenoid when one of said stepping switch movable terminals energizes a fixed terminal connected to said controller stop relay.

11. The combination recited in claim 10 wherein a unit in operation relay is connected in said circuit and actuated when one said soot blower is actuated, said unit in operation relay preventing any blower from starting operation until a given blower has returned to a neutral position.

12. The combination recited in claim 11 wherein said unit in operation relay is connected to said power source by a normally open limit switch on each said soot blower whereby said unit in operation relay is energized each time a soot blower moves off normal position.

References Cited in the file of this patent

UNITED STATES PATENTS

| | | |
|---|---|---|
| 1,680,125 | Bowers | Aug. 7, 1928 |
| 2,522,715 | Graybill et al. | Sept. 19, 1950 |

FOREIGN PATENTS

| | | |
|---|---|---|
| 491,915 | Great Britain | Sept. 8, 1938 |
| 526,405 | Great Britain | Sept. 17, 1940 |
| 597,779 | Great Britain | Feb. 3, 1948 |